COMPOSITIONS.

Reissue Examine 2,584

BEST AVAILABLE COPY

M. Bottcher,

Stuffing-Box Packing.

No. 2,584. Reissued Apr. 30, 1867.

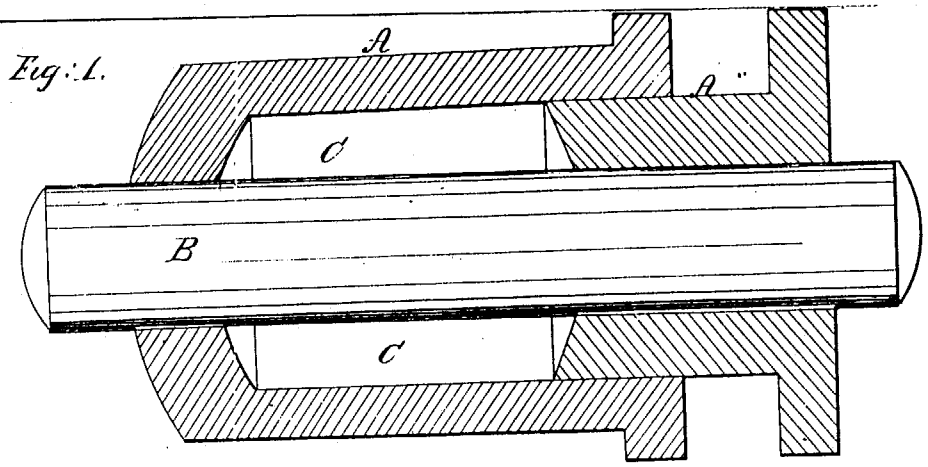

Fig. 1.

Soapstone 9 parts
Asbestos 1 part

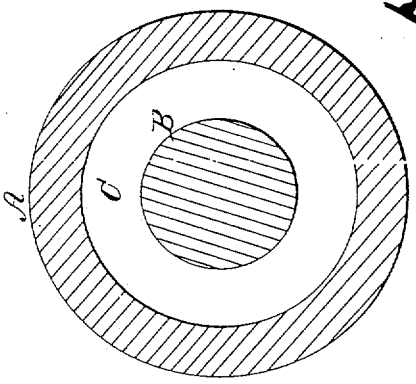

Fig. 2.

Cotton, Hemp, or Flax 2,584.—RICHARD BURR, Philadelphia, Pa., and THE SILVER LAKE MANUFACTURING COMPANY, Newton, Mass., assignees by mesne assignments of MORRIS BOTTCHER.—*Packing for Stuffing Steam and Other Engines.*—Patented October 4, 1864; reissued April 30, 1867.

*Claim.*—A packing for stuffing boxes, expansion joints, &c., composed of dry powdered substances combined with fibrous material, substantially as set forth.

Witnesses;
F. Harper Day
John C. Hollinghead

Inventor;
Morris Bottcher
By his Atty. J. Franklin Reigart

N. PETERS, PHOTO-LITHOGRAPHER, WASHINGTON, D. C.

United States Patent Office.

RICHARD BURR, OF PHILADELPHIA, PENNSYLVANIA, AND THE SILVER LAKE MANUFACTURING COMPANY, OF NEWTON, MASSACHUSETTS, ASSIGNEES BY MESNE ASSIGNMENTS OF MORRIS BOTTICHER.

*Letters Patent No.* 44,575, *dated October* 4, 1864; *reissue No.* 2,584, *dated April* 30, 1867.

IMPROVED PACKING FOR STUFFING STEAM AND OTHER ENGINES.

The Schedule referred to in these Letters Patent and making part of the same.

TO ALL WHOM IT MAY CONCERN:

Be it known that I, MORRIS BOTTICHER, of Newark, in the county of Essex, and State of New Jersey, formerly of Washington, in the District of Columbia, have invented certain improvements in the Manufacture of Packing for Steam Engines, Pumps, Expansion Joints, etc., of which the following is a full, clear, and exact description, reference being had to the accompanying drawings, making part of this specification, in which—

Figure 1 is a longitudinal section through the centre of an ordinary stuffing-box, the piston-rod being shown in elevation.

Figure 2 is a transverse section through the same.

Great difficulty has been experienced in keeping the stuffing-boxes of steam engines tight with the ordinary packing of cotton, hemp, etc., on account of its being so rapidly destroyed by the action of the heat, two or three days being sufficient to reduce it to powder where superheated steam is used, resulting in a waste of steam, and considerable loss of time in renewing the packing. My invention has for its object to overcome these objections, and consists in a packing for stuffing-boxes, expansion joints, etc., composed of dry, powdered substances, combined with fibrous material, which will withstand the heat, and at the same time keep the boxes or joints perfectly tight, no oil or other lubricating substance being required.

To enable others skilled in the art to understand and use my invention, I will proceed to describe the manner in which I have carried it out.

In the said drawings A represents an ordinary stuffing-box, B the piston or valve-rod, and C the chamber for containing the packing, which is made in the following manner: Dry, pulverized soapstone and asbestos are first mixed together in the proportion of about nine-tenths of the former to one-tenth of the latter, and the compound thus produced is mixed with any suitable fibrous material, such as cotton, hemp, flax, etc. The proportions of the soapstone and asbestos may, however, be varied, if desired. If a braided or plaited packing is to be used, the powder may be worked well into the fibrous material while it is being manufactured into the required form, such as a "gasket" or rope, or the fibrous material may be first plaited or braided, and the dry, powdered material afterwards worked into it. The stuffing-box or joint is then filled tightly with the packing above described, more of the powder being added, if found desirable, when the box is being filled. I do not confine myself to the use of soapstone and asbestos, as other dry, powdered substances may be used, such as plumbago, whiting, etc., which will be found to answer a good purpose.

The above-described packing possesses the following advantages: first, great durability, as it is not injured by heat or friction, and will retain its flexibility, thus particularly adapting it for use where superheated steam is used; second, it requires no lubricating with oils, etc., and will keep the boxes tight; third, it can be furnished at a low cost.

My improved packing, besides being applied to stuffing-boxes, may be used to advantnge in axle or journal-boxes, and a great saving in lubricating material thereby effected.

*Claim.*

What I claim as my invention, and desire to secure by Letters Patent, is—

A packing for stuffing-boxes, expansion-joints, etc., composed of dry, powdered substances, combined with fibrous material, substantially as set forth.

MORRIS BOTTICHER.

Witnesses:

WM. A. SMITH,

E. W. COBB.